United States Patent
Mansour et al.

(10) Patent No.: US 10,178,664 B1
(45) Date of Patent: Jan. 8, 2019

(54) INTERFERENCE MITIGATION IN HETEROGENEOUS NETWORKS

(71) Applicant: Sprint Spectrum LP, Overland Park, KS (US)

(72) Inventors: Nagi Mansour, Arlington, VA (US); Kevin Hart, Oakton, VA (US); Shehzad N. Khan, Ashburn, VA (US); Akhilesh Chukka, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 64 days.

(21) Appl. No.: 15/377,168

(22) Filed: Dec. 13, 2016

(51) Int. Cl.
  *H04W 72/04* (2009.01)
  *H04W 72/08* (2009.01)
  *H04B 17/345* (2015.01)
  *H04W 16/32* (2009.01)

(52) U.S. Cl.
  CPC ........ *H04W 72/044* (2013.01); *H04B 17/345* (2015.01); *H04W 16/32* (2013.01); *H04W 72/082* (2013.01)

(58) Field of Classification Search
  CPC . H04W 72/044; H04W 72/082; H04W 16/32; H04B 17/345
  See application file for complete search history.

(56) References Cited

U.S. PATENT DOCUMENTS

| | | | |
|---|---|---|---|
| 8,718,704 B2 | 5/2014 | Khanka et al. | |
| 8,792,889 B2 | 7/2014 | Wang et al. | |
| 2009/0046573 A1* | 2/2009 | Damnjanovic | H04J 11/0093 370/216 |
| 2011/0250868 A1* | 10/2011 | Peng | H04W 4/08 455/411 |
| 2011/0261704 A1 | 10/2011 | Etemad | |
| 2012/0307750 A1* | 12/2012 | Hunukumbure | H04W 16/02 370/329 |
| 2014/0056250 A1* | 2/2014 | Cattoni | H04W 72/082 370/329 |
| 2015/0009910 A1* | 1/2015 | Ryu | H04W 72/04 370/329 |
| 2015/0163784 A1* | 6/2015 | Calin | H04W 28/06 370/330 |
| 2016/0191417 A1* | 6/2016 | Lutz | H04W 72/0486 370/336 |
| 2017/0099663 A1* | 4/2017 | Lee | H04W 4/70 |

* cited by examiner

*Primary Examiner* — Brian D Nguyen

(57) ABSTRACT

Devices, systems, and methods to reduce interference in heterogeneous networks having a plurality of access nodes, such as combinations of macro cells, micro cells, pico cells, femto cells, etc. are disclosed. Interference caused in sectors of two or more access nodes that face each other is minimized by dividing a total number of resource blocks into resource block sets that are uniquely numbered and allocated across each sector of each access node. The allocation is rotated based on a different time stamp or a different starting number, or may be a random sequence of sets per access node. These independent allocations for each access node generally distribute the interference across the system, and provide better interference reduction, resulting in an increase in system capacity per sector of each cell.

18 Claims, 7 Drawing Sheets

INTERFERENCE MITIGATION IN HETEROGENEOUS NETWORKS

TECHNICAL BACKGROUND

A heterogeneous network can be configured to include various types of access nodes such as a macro access node, a micro access node, a pico access node, a femto access node, etc. In some heterogeneous networks, a wireless device at the edge of an access node coverage area can experience signal interference when frequencies are re-used by neighboring access nodes. Such interference may occur, for instance, at the edges of the access nodes due to overlapping with other access nodes. Such inter-cell interference (ICI) may degrade data transmission near coverage area edges, reducing data throughput and spectral efficiency to wireless devices near a coverage area edge. Existing methods to mitigate interference such as inter-cell interference coordination (ICIC) or scheduling schemes comprising almost blank subframes (ABS) require repeated communication between the cells, which increases overhead, or lose capacity due to muting resource blocks that could otherwise be used to carry traffic.

OVERVIEW

Exemplary embodiments described herein include systems, methods, and nodes for mitigating interference in heterogeneous wireless communication networks. For instance, a method for mitigating interference in a network comprises determining that a wireless device attached to a first access node having a first coverage area enters a potential interference area of the first coverage area. The potential interference area comprises a portion of the first coverage area that overlaps with a second coverage area of a second access node. Upon a cell load of the first access node meeting a threshold, a randomized allocation of resource blocks is scheduled for the wireless device. Upon the cell load falling below the threshold, interference coordination operations are performed between the first access node and the second access node.

In another exemplary embodiment, a system for mitigating interference comprises a processing node configured to determine, for a wireless device within a potential interference area between a first access node and a second access node, a cell load of the first access node, wherein the wireless device is attached to the first access node. The operations further comprise determining that the cell load meets a threshold, and scheduling a first random allocation of a plurality of resource blocks to the first access node and a second random allocation of the plurality of resource blocks to the second access node. The first random allocation is different from the second random allocation.

In yet another exemplary embodiment, a processing node for mitigating interference is configured to perform operations comprising determining that a cell load of an access node meets a threshold. A first plurality of wireless devices attached to the access node is determined to be within a potential interference area between the access node and an overlapping sector of a neighboring access node. A randomized allocation of resource blocks is scheduled for the first plurality of wireless devices.

DETAILED DESCRIPTION

Figure 1:
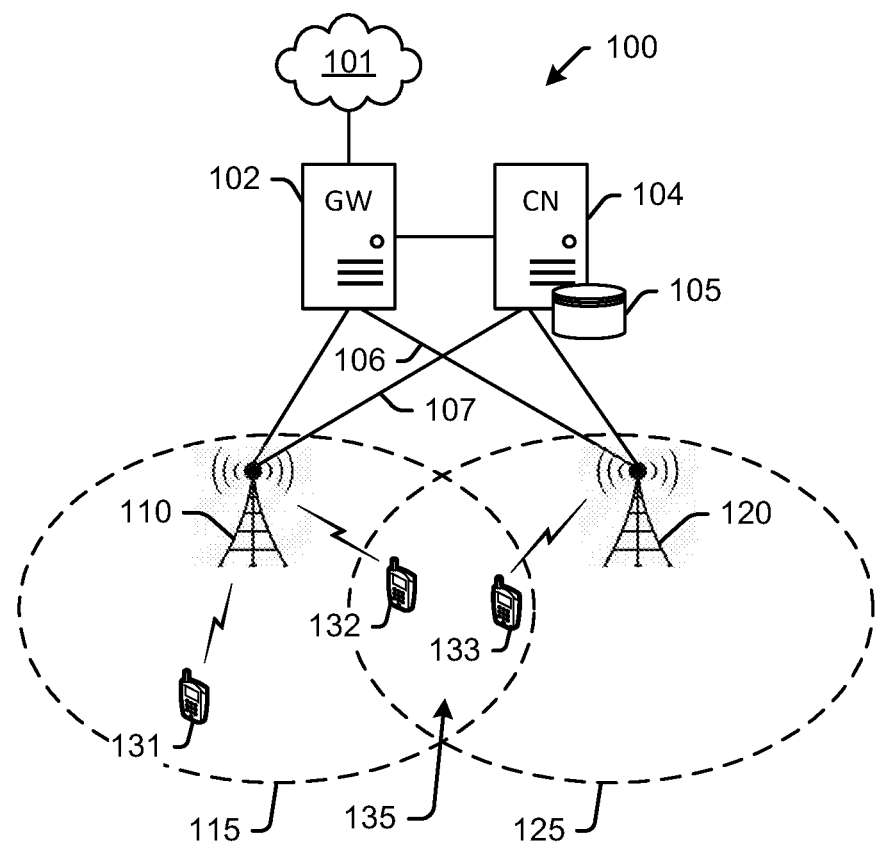
FIG. 1 illustrates an exemplary system for mitigating interference.

The disclosed embodiments illustrate devices, systems, and methods to reduce interference in heterogeneous networks having a plurality of access nodes, such as combinations of macro cells, micro cells, pico cells, femto cells, etc. Interference may be caused in sectors of two or more access nodes that face each other, and potentially overlap each other. Such overlapping areas may be referred to as potential interference areas. The disclosed embodiments are intended to minimize interference by determining that a wireless device attached to a first access node having a first coverage area enters a potential interference area within the first coverage area. The potential interference area comprises a portion of the first coverage area that overlaps with a second coverage area of a second access node. A processing node may be configured to determine a cell load of the first access node. Upon the cell load of the first access node meeting a threshold, a randomized allocation of resource blocks is scheduled for the communication link between the first access node and the wireless device. Further, a second random allocation of the plurality of resource blocks is scheduled for the second access node and wireless devices attached thereto. The first random allocation is different from the second random allocation. In other words, upon the cell load of an access node meeting a threshold, a randomized allocation of resource blocks is scheduled for wireless devices attached to the access node and within a potential interference area between the access node and an overlapping sector of a neighboring access node.

Randomizing the allocation of resource blocks comprises dividing a total number of resource blocks available in a network into resource block sets (RBS) that are uniquely numbered and allocated across each sector of each access node. The allocation is rotated based on a different time stamp or a different starting number, so as to improve the odds of each facing sector that may potentially be subject to interference being assigned a different RBS number. The allocation may be a random sequence of RBS per access node. These independent allocations for each access node generally distribute the interference across the system, and provide better interference reduction compared to currently proposed techniques that require coordination between access nodes, or muting of resource blocks in the facing sectors. Further, the reduction in interference results in an increase in system capacity per sector of each cell. The determination of the potential interference area and the randomized scheduling scheme may be communicated to the second access node; however, such communication is not necessary, as the increased system capacity can result from only the serving access node randomizing its resource allocations.

Upon the cell load of the serving (i.e. first) access node falling below the threshold, it may be determined that randomized allocations are unnecessary, and standard interference coordination operations may instead be performed between the first access node and the second access node. The interference coordination operations can include muting subframes in coordination with the second access node. Further, if the wireless device(s) leave the potential interference area of the first access node, the randomized scheduling (and any interference coordination operations) can be paused or halted, and standard power management operations performed for the wireless device(s). These and other operations are further described below with reference to the embodiments depicted in FIGS. 1-7.

FIG. 1 depicts an exemplary system 100 for data transmission using frame reconfiguration. System 100 comprises a communication network 101, gateway 102, controller node 104, access nodes 110 and 120, and wireless devices 131, 132, and 133. Access node 110 is illustrated as having a coverage area 115, and access node 120 is illustrated as having a coverage area 125. Wireless devices 131, 132 are located within coverage area 115 and access network services from access node 110. Wireless device 133 is located within coverage area 125 and accesses network services from access node 120. Further, wireless devices 132 and 133 are located within potential interference area 135 formed by an overlap of coverage areas 115, 125. Thus, and as further described herein, interference mitigation operations are performed generally for wireless devices 132, 133, and any other wireless device subject to interference within potential interference area 135 or other potential interference areas.

For example, a network node (such as access node 110) may be configured to minimize interference experienced by a wireless device (such as wireless device 132 connected thereto) by determining that the wireless device enters potential interference area 132. The network node may be configured to determine a cell load of access node 110. Upon the cell load of access node 110 meeting a threshold, a randomized allocation of resource blocks is scheduled for the communication link between access node 110 and wireless device 132. Further, a second random allocation of the plurality of resource blocks may be scheduled for access node 120 and wireless devices attached thereto, such as wireless device 133. The first random allocation is different from the second random allocation. Randomizing the allocation of resource blocks increases the odds of each facing sector (i.e. sectors of access nodes 110, 120 that are potentially subject to interference) being assigned different sets of resource blocks, or resource block sets (RBS). The allocation may be a random sequence of RBS per access node. These independent allocations for each access node generally distribute the interference across the system, and provide better interference reduction compared to currently proposed techniques that require coordination between access nodes, or muting of resource blocks in the facing sectors. Further, the reduction in interference results in an increase in system capacity per sector of each cell. The determination of the potential interference area and the randomized scheduling scheme may be communicated from access node 110 to access node 120; however, such communication is not necessary, as the increased system capacity can result from only the serving access node (i.e. access node 110) randomizing its resource allocations.

Further, upon the cell load of access node 110 falling below the threshold, interference coordination operations may be performed between access node 110 and neighboring access node 120. The interference coordination operations can include muting subframes in coordination with access node 120. Further, if wireless device(s) 132, 133 leave potential interference area 135, the randomized scheduling (and any interference coordination operations) can be paused or halted, and standard power management operations performed for said wireless device(s).

Moreover, potential interference area 135 may be indicated to one or more of access nodes 110, 120, via controller node 104 or another network element. The potential interference area 135 may be any portion of a sector of each access node that overlaps a sector of at least one additional access node. Alternatively or in addition, a rotation of allocation of resource block sets may be triggered by an indication of interference from wireless device 132 when it is located in potential interference area 135. This feature may be extended to receiving an indication of a second potential interference area (not shown) caused by an additional neighboring access node, and repeating the dividing and rotating steps for all access nodes, so as to distribute the interference and minimize repeated interference in the same region. Further, one or more of access nodes 110, 120 may comprise logic for performing operations including determining a potential interference area 135 between coverage areas 115, 125, and rotating between resources assigned to access nodes 110 or 120, such that the sectors/antennae that service the potential interference area 135 use different resource block sets.

Access nodes 110, 120 can be any network node configured to provide communication between wireless devices 131, 132, 133 and communication network 101, including standard access nodes and/or short range, low power, small access nodes. For instance, access nodes 110, 120 may include a macrocell access node, base transceiver station, a radio base station, an eNodeB device, an enhanced eNodeB device, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131, 132, 133 may be any device, system, combination of devices, or other such communication platform capable of communicating wirelessly with access nodes 110, 120 using one or more frequency bands deployed therefrom. Wireless devices 131, 132, 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 120. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a packet data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as coordinates of potential interference area 135, ranges of coverage areas 115, 125, positions of wireless devices 131, 132, 133, scheduling schemes associated with each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

Figure 2:
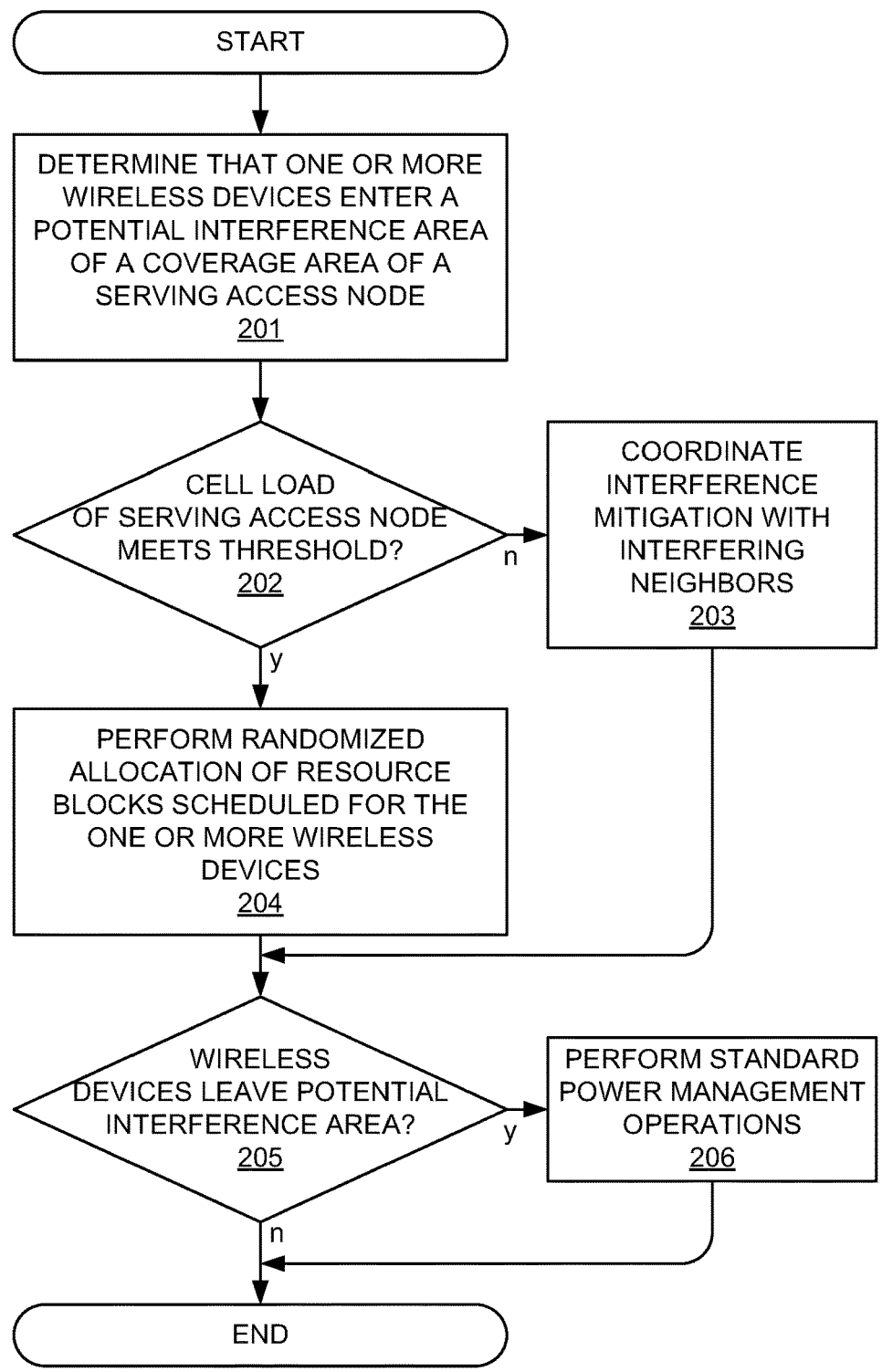
FIG. 2 illustrates an exemplary method for mitigating interference.

FIG. 2 illustrates an exemplary method for mitigating interference. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 201, a wireless device attached to a first access node having a first coverage area enters a potential interference area within the first coverage area. The potential interference area comprises a portion of the first coverage area that overlaps with a second coverage area of a second access node. The potential interference area may be a geographical region where interference may be caused by sectors of two or more access nodes that face each other, and potentially overlap each other. A size or location of the potential interference area may be determined based on, for example, overlapping coverage areas or sectors between two or more neighboring access nodes. If a network operator installs a new access node, then a potential interference area may be determined based on the location of the new access node, a range of the access node, or any combination of location and range with respect to a sector size and potential overlap of sectors between access nodes. Potential interference areas may further be determined via an interference indication or report received from one or more wireless devices within the region. For example, wireless devices in communication with a serving access node can experience interference if they are located in a portion of the coverage area overlapping a neighboring access node's coverage area. A signal condition of the wireless devices can be indicative of interference based on a signal characteristic such as a received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference ratio (SINR), and signal to quantization noise ratio (SQNR). If sufficient interference is detected, for instance if the received interference reports/indicators exceed a threshold, then a determination is made as to the presence of a potential interference area.

At 202, a cell load of the serving access node is determined to meet (or exceed) a threshold. For example, the cell load may be within a maximum threshold and may rise to meet or exceed the maximum threshold. If the cell load of the serving access node does not meet (or falls below) the threshold, interference coordination operations may be performed between the serving access node and neighboring access nodes at 203. The interference coordination operations can include muting subframes in coordination with the neighboring access nodes.

However, if the cell load meets or exceeds the threshold, a randomized allocation of resource blocks is scheduled for the communication link between the serving access node and the wireless device at 204. In addition, different random allocations of the plurality of resource blocks may be scheduled for each of one or more neighboring access nodes and wireless devices attached thereto. In other words, upon the cell load of an access node meeting a threshold, a randomized allocation of resource blocks is scheduled for wireless devices attached to the access node and within a potential interference area between the access node and an overlapping sector of a neighboring access node. Randomizing the allocation of resource blocks comprises dividing a total number of resource blocks available in a network into resource block sets (RBS) that are uniquely numbered and allocated across each sector of each access node. The allocation is rotated based on a different time stamp or a different starting number, so as to improve the odds of each facing sector that may potentially be subject to interference being assigned a different RBS number. The allocation may be a random sequence of RBS per access node. These independent allocations for each access node generally distribute the interference across the system, and provide better interference reduction compared to currently proposed techniques that require coordination between access nodes, or muting of resource blocks in the facing sectors. Further, the reduction in interference results in an increase in system capacity per sector of each cell.

At 205, a position of the wireless device or devices is monitored to determine if the wireless device(s) leave the potential interference area of the serving access node. If the wireless device(s) leave the potential interference area, the randomized scheduling (and any interference coordination operations) can be paused or halted, and standard power management operations performed for the wireless device(s) at 206, such as uplink power control based on reference signal receive power (RSRP), etc. If the wireless device(s) remain within the potential interference area, the method ends or continues until either the cell load drops below the threshold or the wireless device(s) leave the potential interference area.

Figure 3:
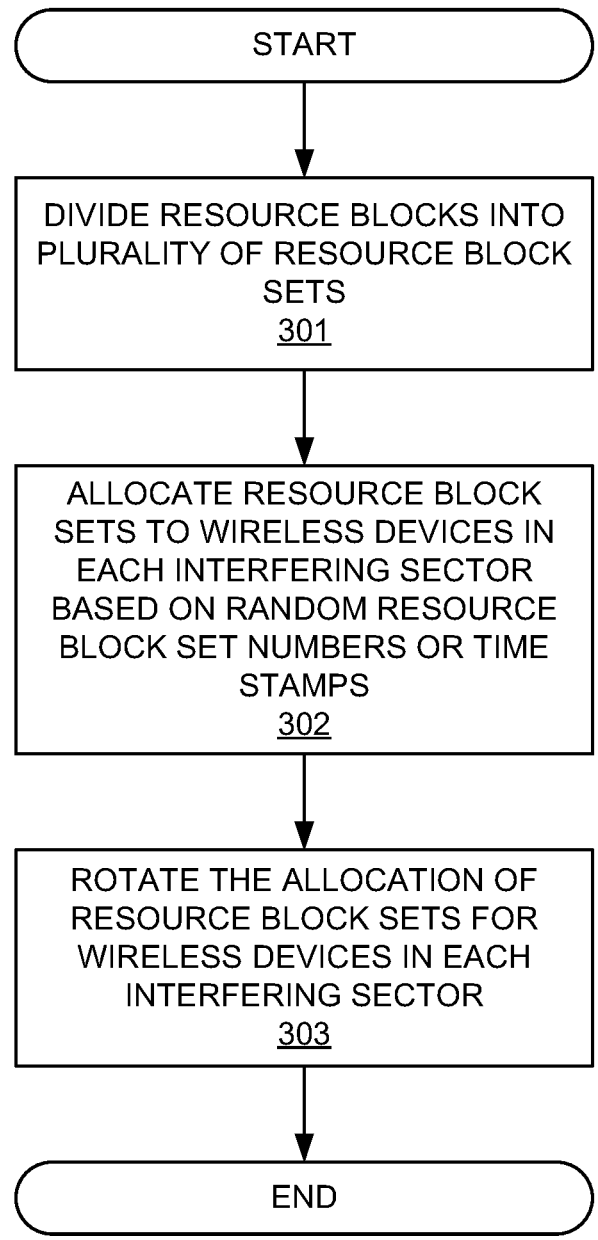
FIG. 3 illustrates an exemplary method for randomized allocation of resource blocks.

FIG. 3 illustrates an exemplary method for randomized allocation of resource blocks. At 301, resource blocks available within a system or network are divided into a plurality of resource block sets. The number of sets varies, and may depend on the number of access nodes in the system, the number of sectors, the number of potentially interfering regions, historical throughput for each access node or sector, and other factors. For example, a 20 MHz LTE network may include 100 resource blocks, which can be divided into 20 resource block sets of 5 resource blocks each, and the 20 RBS may be allocated among the various sectors of one or more eNodeBs. Any other division and allocation scheme may be appropriate, depending on the circumstances, and may be evident to those having ordinary skill in the art in light of this disclosure. Ideally, all resource blocks are used, so that no resource blocks are wasted. Further, each block is uniquely numbered, so that the unique RBS numbers can be rotated among the sectors as further described herein.

At 302, the RBS are allocated to wireless devices within each interfering sector or potential interference area served by the access node. The RBS may be allocated based on a number of potential interference areas, a number of antennas or sectors in each access node, a number of wireless devices served by the access node, a ratio of wireless devices within a potential interference area to wireless devices outside the potential interference area, and other factors. This allocation may be assigned based on instructions from a controller node, from a communication network, or from logic within one or more access nodes.

Then, at 303, the allocation is rotated. The rotation may occur as needed; for instance, when additional resource blocks are needed in different sectors depending on usage, etc. This rotation may occur independently at each serving access node and/or sectors thereof, or may be based on instructions from a controller node or other network entity. Notably, the rotation of allocations is performed independently at each access node, with no need for communication or coordination between neighboring access nodes. Optionally, the scheduling scheme may be communicated from a serving access node to neighboring access nodes, enabling neighboring access nodes to perform similar randomized allocations. In an exemplary embodiment, randomized allocation scheme may be communicated to all neighboring access nodes, directly (i.e. via X2 connections between the neighboring access nodes) or from a controller node. The allocation scheme may further include instructions to begin the rotation at a different time stamp for each access node. Alternatively or in addition, the allocation scheme may include instructions to begin the rotation at a different RBS number for each access node. The allocation and rotation scheme may also be random. These allocations ensure that interference is minimized across potentially interfering regions, as further described herein and with references to FIGS. 5 and 6.

Figure 4:
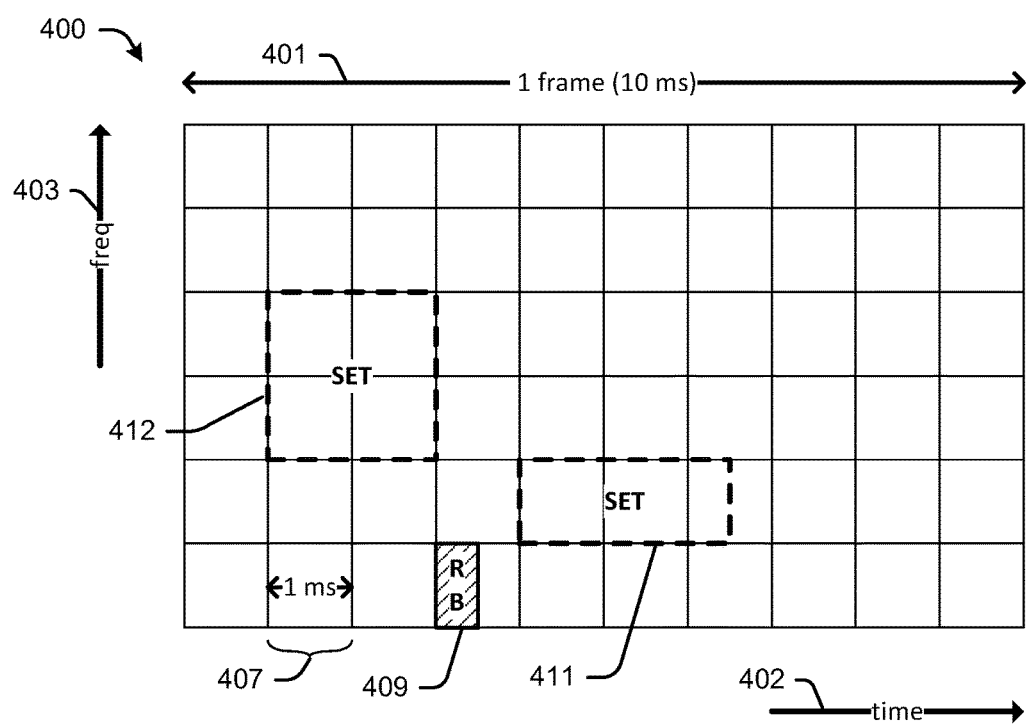
FIG. 4 illustrates exemplary resource block sets within a radio frame.

Meanwhile, FIG. 4 illustrates exemplary resource block sets within a radio frame. As is generally known in the art, an LTE radio frame, such as frame 400, is 10 ms in duration, and comprises 10 subframes 407, each of which is 1 ms long. A subframe comprises two resource blocks (RBs), such as RB 409, each of which is 0.5 ms in duration. Further, each RB has a bandwidth of 180 kHz and, although six blocks are depicted along the frequency axis 403, more may be included and are not depicted for reasons of clarity. On a 10 MHz carrier, for instance, 50 blocks may be used, and on a 20 MHz carrier, 100 blocks may be used.

For the purposes of the subject disclosure, a plurality of RBs 409 may be grouped into one or more resource block sets (RBS), such as RBS 411, 412. RBS 411 is a resource block set comprising 5 RBs, as described above, and RBS 412 comprises 8 RBs. Any grouping may be used depending on a number of access nodes and sectors that the RBS are allocated to, and all available RBs may be grouped into one of several RBS. The grouping of RBS can further be based on various factors such as the amount of information to be sent in the downlink to wireless devices in communication with each access node, a load on each access node, a load on the network, and an application requirement of an application running on a wireless device in communication with an access node. The load on each access node can comprise a number of wireless devices in communication with each access node, a total amount of data addressed to all wireless devices in communication with each access node, a utilization of resource blocks in a frame, carrier or channel, an amount of uplink and/or downlink traffic associated with each wireless device, the total bandwidth available for scheduling communication at each access node, etc. The load on the network can comprise a total amount of traffic associated with each network node in the backhaul of the wireless network, a throughput of each network node, a processing load at each network node, and any delay associated with each network node.

Figure 5A:
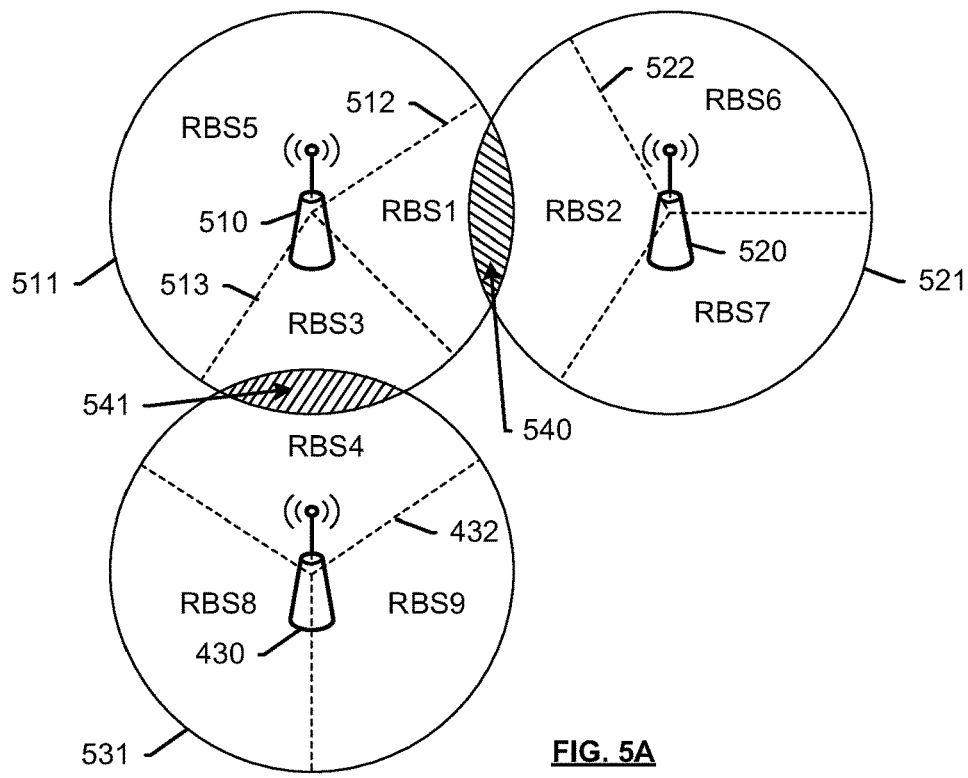
FIGS. 5A and 5B illustrate exemplary allocation of resource block sets among access nodes to mitigate interference.
Figure 5B:
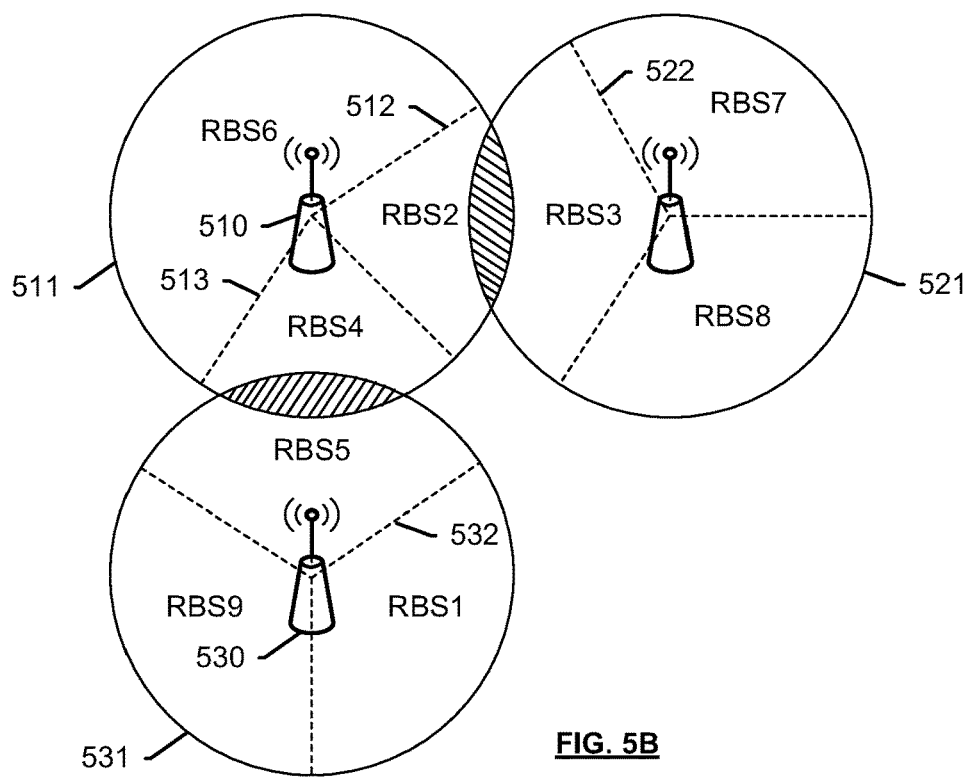

FIGS. 5A and 5B illustrate exemplary allocation of resource block sets among access nodes to mitigate interference. With respect to both FIGS. 5A and 5B, access nodes 510, 520, and 530 have 3 sectors each, and share the same total resources that are divided in resource blocks RBS1 . . . RBS9. Each access node 510, 520, and 530 has a corresponding signal range or coverage area 511, 521, and 531. The ranges 511, 521, and 531 overlap in potential interference area 540, between sector 512 of access node 510 and sector 522 of access node 520, and potential interference area 541, between sector 512 of access node 510. Potential interference areas 540, 541 may be determined either by a proximity or distance of access nodes 510, 520, 530, or by interference reports, or any other means to indicate interference or a potential source of interference.

Referring to FIG. 5A, the allocation of resource block sets is such that in each potential interference area 540, 541, the serving sectors 512 and 522 have been randomly allocated different sets RBS1 and RBS2, and the serving sectors 513 and 532 have been randomly allocated different sets RBS3 and RBS4. Therefore, any potential interference in these regions is mitigated. Now, referring to FIG. 5B, the randomized allocation of resource blocks has been rotated between all access nodes 510, 520, 530, such that the potential interference areas 540, 541 continue to be served by sectors having different resource block sets. For instance, as shown in the figure, sectors 512 and 522 now use RBS2 and RBS3 respectively, and sectors 513 and 532 now use RBS4 and RBS5, respectively. In other words, the allocation of RBS has hopped across different nodes, while minimizing interference. Various additional combinations may be conceivable to those having ordinary skill in the art in light of this disclosure. Further, although the allocation in these access nodes 510, 520, and 530 can use all resource block sets in all sectors, there may be embodiments where specific resource block sets are allocated to specific access nodes.

In another exemplary embodiment the access nodes 510, 520, and 530 share resources that may be divided in resource blocks RBS1, RBS2, and RBS3. In other words, all available resource blocks are divided into 3 sets. In this way, the same resources can be used by different sectors without being subject to interference. In another exemplary embodiment, a small cell access node may be completely within a coverage area of a macro cell access node. Therefore, any resource allocation of the macro cell access node utilizing the same frequency as an allocation of the small cell access node would cause interference to devices within range of the small cell access node. In such a scenario, resource block sets are allocated such that the randomized allocation of each access node is different. Moreover, due to the random nature of resource allocations, the resource blocks may overlap, in which case another rotation may have to be performed until there is no interference. In either case, the ongoing rotation may be performed with minimal to no communication between neighboring access nodes, unlike prior art methods.

Figure 6A:
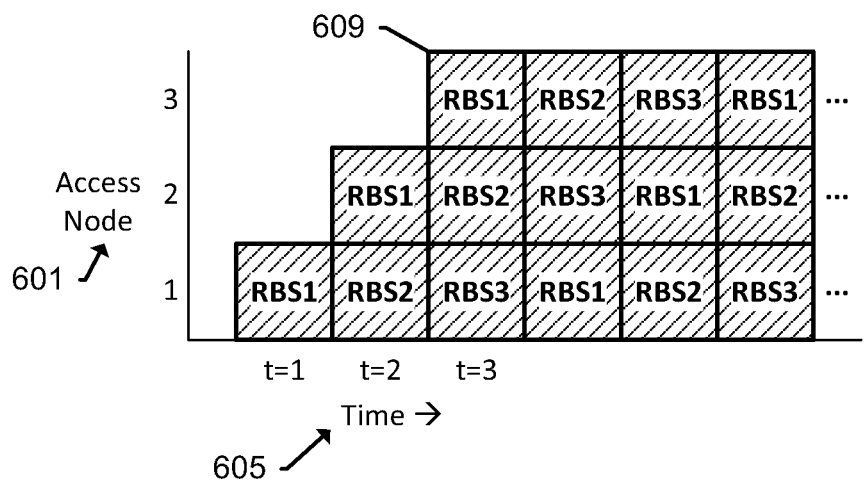
FIGS. 6A and 6B illustrate exemplary allocations of resource block sets based on a time stamp and a resource block set number, respectively.
Figure 6B:
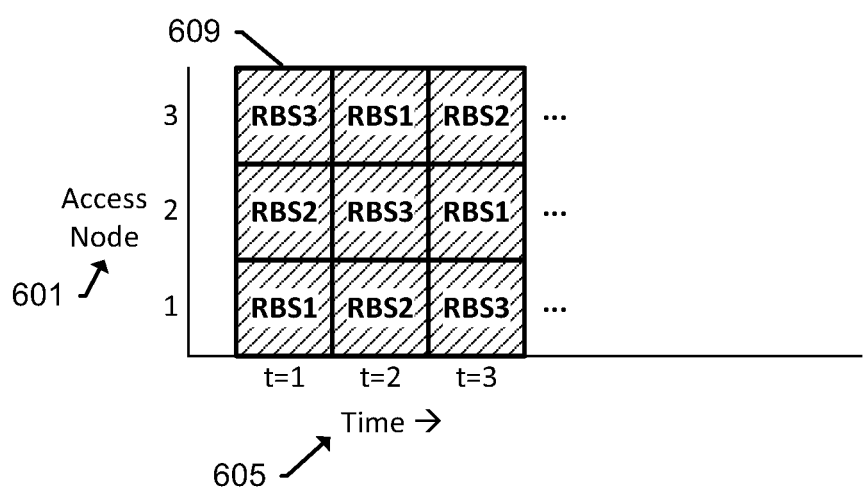

FIGS. 6A and 6B illustrate exemplary allocations of resource block sets based on a time stamp and a resource block set number, respectively. With respect to FIG. 6A, access nodes 1, 2, 3 (601) are allocated resource block sets 609 based on different time stamps 605. Specific sectors of each access node 1, 2, 3 may be assigned these blocks to prevent interference. For instance, a potentially interfering sector within access node 1 is allocated resource block RBS1 at timestamp t=1, RBS2 at t=2, and RBS3 at t=3. A potentially interfering sector within access node 2 is allocated the same resource block sets in the same order, but with a different time stamp. That is, the sector within access node 2 is allocated resource block RBS1 at timestamp t=2, RBS2 at t=3, and so on. Therefore, the potentially interfering sectors of access nodes 1 and 2 will never share the same resource block at the same time. Similarly, a potentially interfering sector within access node 3 is allocated the same resource block sets in the same order, but with a different time stamp. That is, the sector within access node 3 is allocated resource block RBS1 at timestamp t=3, and so on.

Although sequential timestamps are shown, even the time stamp allocation may be randomized to increase the chances of each access node being allocated RBS at different time stamps.

Referring to FIG. 6B, access nodes 1, 2, 3 are allocated resource block sets 609 based on the same time stamp 605, but in a different order, or starting from a different RBS number. For instance, a potentially interfering sector within access node 1 is allocated resource block RBS1 at timestamp t=1, RBS2 at t=2, and RBS3 at t=3. A potentially interfering sector within access node 2 is allocated resource block RBS2 at timestamp t=1, RBS3 at t=2, and RBS1 at t=3. Similarly, a potentially interfering sector within access node 3 is allocated resource block RBS3 at timestamp t=1, RBS1 at t=2, and RBS2 at t=3, and so on. Therefore, the potentially interfering sectors of access nodes 1, 2, and 3 will never share the same resource block at the same time.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 7:
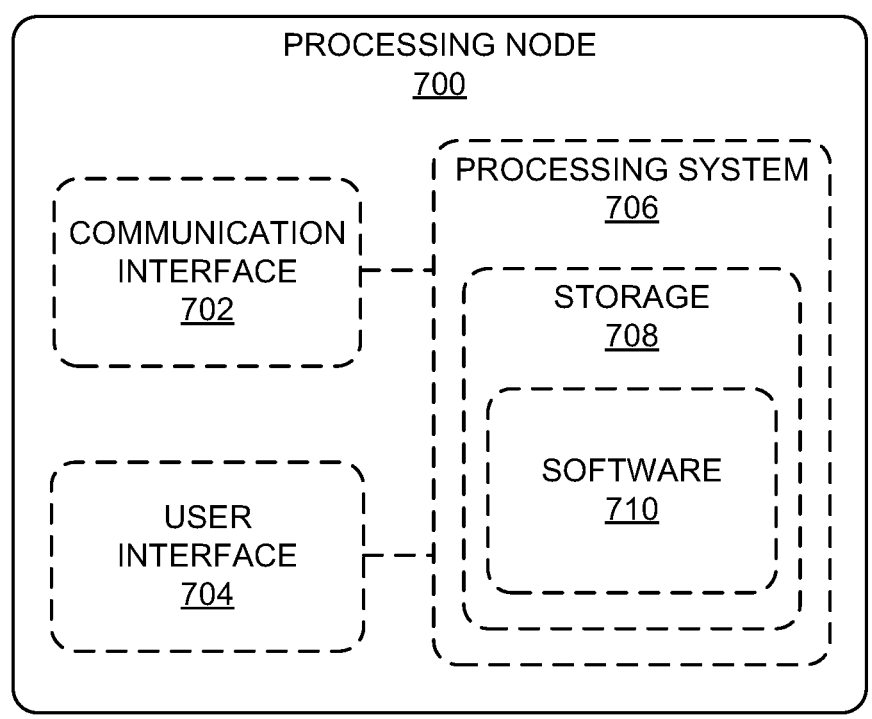
FIG. 7 illustrates an exemplary processing node.

FIG. 7 illustrates an exemplary processing node 700 comprising communication interface 702, user interface 704, and processing system 706 in communication with communication interface 702 and user interface 704. Processing node 700 is capable of paging a wireless device and communicating with access nodes via communication interface 702. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

An example of processing node 700 includes access nodes 110, 120. Processing node 700 can also be an adjunct or component of a network element, such as an element of access node 110, 120, gateway 103, controller node 104, a mobility management entity, a gateway, a proxy node, a wireless device or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for mitigating interference in a wireless communication network, the method comprising:
   determining that a wireless device attached to a first access node having a first coverage area enters a potential interference area of the first coverage area, wherein the potential interference area comprises a portion of the first coverage area that overlaps with a second coverage area of a second access node;
   upon a cell load of the first access node meeting a threshold, randomizing an allocation of resource blocks scheduled for the wireless device; and
   upon the cell load falling below the threshold, performing interference coordination operations between the first access node and the second access node.

2. The method of claim 1, wherein randomizing the allocation of resource blocks scheduled for the wireless device comprises dividing a total number of resource blocks into a plurality of resource block sets, and randomly allocating one or more resource block sets from the plurality of resource block sets to the first wireless device.

3. The method of claim 2, wherein randomly allocating the one or more resource block sets comprises allocating each of the one or more resource block sets at a different timestamp.

4. The method of claim 2, wherein each resource block set is assigned a unique resource block set number, and wherein randomly allocating the one or more resource block sets comprises randomizing the unique resource block set number.

5. The method of claim 1, further comprising determining the potential interference area based on an indication of interference from the wireless device.

6. The method of claim 5, further comprising determining the cell load based on the indication of interference.

7. The method of claim 1, further comprising determining that the wireless device leaves the potential interference area, pausing the randomizing and interference coordination operations, and performing standard power management operations for the wireless device.

8. A system for mitigating interference in a wireless communication network, the system comprising:
   a processing node configured to determine, for a wireless device within a potential interference area between a first access node and a second access node, a cell load of the first access node, wherein the wireless device is attached to the first access node;

upon the cell load meeting a threshold, scheduling a first random allocation of a plurality of resource blocks to the first access node and a second random allocation of the plurality of resource blocks to the second access node; and upon the cell load falling below the threshold, coordinating interference coordination operations with the second access node, wherein the first random allocation is different from the second random allocation.

9. The system of claim 8, wherein the determination of the potential interference area is based on a pair of overlapping sectors of the first access node and the second access node.

10. The system of claim 8, wherein the determination of the potential interference area is based on a presence of the second access node within a range of a sector of the first access node.

11. The system of claim 10, wherein the first access node comprises a macro access node and the second access node comprises a small cell node.

12. The system of claim 8, wherein the determination of the potential interference area is based on receiving an indication of interference from the wireless device.

13. The system of claim 8, wherein the operations further comprise communicating the determination of the potential interference area to the second access node.

14. The system of claim 8, wherein the interference coordination operations comprise muting subframes in coordination with the second access node.

15. The system of claim 8, wherein the operations further comprise:

determining that the wireless device enters a second potential interference area associated with a third access node; and upon the cell load meeting the threshold, scheduling a third random allocation of the plurality of resource blocks to the third access node, wherein the third random allocation is different from each of the first and the second random allocations.

16. A processing node for mitigating interference in a wireless communication network, the processing node being configured to perform operations comprising:

determining that a cell load of an access node meets a threshold;

for a first plurality of wireless devices attached to the access node and within a potential interference area between the access node and an overlapping sector of a neighboring access node, randomizing an allocation of resource blocks scheduled for the first plurality of wireless devices;

determining that the cell load of the access node does not meet the threshold; and scheduling almost-blanks subframes for the first plurality of wireless devices in coordination with the neighboring access node.

17. The processing node of claim 16, wherein randomizing the allocation of resource blocks scheduled for the first plurality of wireless device comprises dividing a total number of resource blocks into a plurality of resource block sets, and randomly allocating one or more resource block sets from the plurality of resource block sets to the first plurality of wireless devices.

18. The processing node of claim 16, further comprising performing standard power management operations for a second plurality of wireless devices outside the potential interference area.

* * * * *